United States Patent [19]

Nagashima et al.

[11] Patent Number: 4,783,207

[45] Date of Patent: Nov. 8, 1988

[54] AIR CLEANER

[75] Inventors: Akira Nagashima, Kawasaki; Fujio Sasaki, Mitaka, both of Japan

[73] Assignee: Kioritz Corporation, Tokyo, Japan

[21] Appl. No.: 105,337

[22] Filed: Oct. 6, 1987

[30] Foreign Application Priority Data

Oct. 14, 1986 [JP] Japan ................................ 61-157227

[51] Int. Cl.[4] ................................................ B01D 46/10

[52] U.S. Cl. ......................................... 55/498; 55/510; 123/198 E; 30/388

[58] Field of Search ................. 55/385 R, 385 B, 498, 55/510, 320; 30/388; 123/198 E

[56] References Cited

U.S. PATENT DOCUMENTS 4,594,083 6/1986 Hirazumi .......................... 55/385 R
4,620,367 11/1986 Tubesing ............................... 30/388

FOREIGN PATENT DOCUMENTS 246583 8/1963 Australia ............................... 55/276
140271 10/1979 Japan ...................................... 55/510
750118 7/1980 U.S.S.R. ................................ 55/320

*Primary Examiner*—Bernard Nozick
*Attorney, Agent, or Firm*—Browdy and Neimark

[57] ABSTRACT

An air cleaner comprising a bowl-shaped air cleaner main body whose upper end is opened upwardly and formed with air intake ports at a portion of a peripheral wall, a cap member for covering the opening of the air cleaner main body, a cylindrical cleaner element in the air cleaner main body, and a bowl-shaped dividing member for dividing a space within the cleaner element into an upper space and a lower space, in which the upper space communicates with the air intake ports while it is connected to an annular chamber defined between the air cleaner main body and the cleaner element.

5 Claims, 2 Drawing Sheets

AIR CLEANER

BACKGROUND OF THE INVENTION

1. FIELD OF THE INVENTION

The present invention relates to an air cleaner connected to a carburetor of an internal combustion engine for supplying filtered air thereinto and, more particularly, to an air cleaner mounted on portable working machines such as an engine cutter or a chain saw and so on.

2. DESCRIPTION OF THE PRIOR ART

Air cleaners of the conventional type are arranged, for example, in such a manner that a cylindrical cleaner element is disposed within a cleaner main body to draw outside air into a space between the cleaner main body and the cleaner element in a direction circumferential along the outer periphery of the cleaner element, to filter the introduced air by passing it through the cleaner element, to introduce the air into an inner space defined within the cylindrical cleaner element, and to supply the clean air through an elbow or the like from the inner space into a carburetor.

In these conventional air cleaners, because dust having relatively large particle sizes easily arrives at and is directly received on a surface of the cleaner element, the cleaner element becomes clogged in a short period of time so that the frequent cleaning and the replacement of the cleaner element must be conducted. The whole cylindrical surface of the cleaner element cannot thus uniformly pass the air therethrough, and these cause problems deteriorating cleaning efficiency and inhibiting available utility for the cleaner elements, whereby the cleaner may produce relatively large noise during sucking air.

SUMMARY OF THE INVENTION

Accordingly, it is an object of the present invention to solve the problems of conventional air cleaners and provide a new air cleaner which is of simple structure and convenient type.

That is, an air cleaner for supplying filtered air to a carburator of an interval combustion engine according to the present invention comprises a bowl-shaped air cleaner main body whose upper end is opened upwardly and formed with air intake ports at a portion of a peripheral wall, a cap member detachably mounted on the air cleaner main body for covering the opening of the air cleaner main body, a cylindrical cleaner element disposed within the air cleaner main body for purifying the air, and a bowl-shaped dividing member located within a space at the center of the cleaner element for dividing such a space into an upper space and a lower space. The upper space communicates with the air intake ports while it is connected to an annular chamber defined between the air cleaner main body and the cleaner element, and the lower space communicates with a carburetor, whereby the air sucked from the air intake ports is introduced as the purified air into the lower space to deliver it to the carburetor.

According to the above arrangement of the present invention, the air sucked into the air cleaner first flows downwardly in the upper space along the curved surface of the bowl-shaped dividing member and then flows upwardly while some of the dust in the air flow falls on the bottom wall portion and remains, so that the air from which the relatively large dust particles is previously removed passes through the cleaner element to be filtered sufficiently and is directed to the lower space for supplying into the carburetor.

In this manner, according to the present invention an air cleaner can be provided which is especially suitable for applying to various working machines such as a engine cutter or a chain saw and so on. Since the sucked air is previously purified and is free from the relatively large size particles of the dust by exposure to at least two steps of dust removing functions before the air passes through the cleaner element, the early clogging of the cleaner element is thus prevented so as to fully lengthen its span of life, and accumulated dust in the air cleaner can be readily removed only by detaching the cap member from the air cleaner. Further, since the whole peripheral surface of the cleaner element is uniformly applied to air filtration, high cleaning efficiency not only can be obtained, the structure of the air cleaner also can be miniaturized. And further, since a distance for sucked air flowing through the air cleaner is extended the suction noise can be decreased accordingly.

DESCRIPTION OF THE PREFERRED EMBODIMENT

Next, the invention will be fully described hereinunder with reference to the drawings showing a preferred embodiment.

Figure 1:
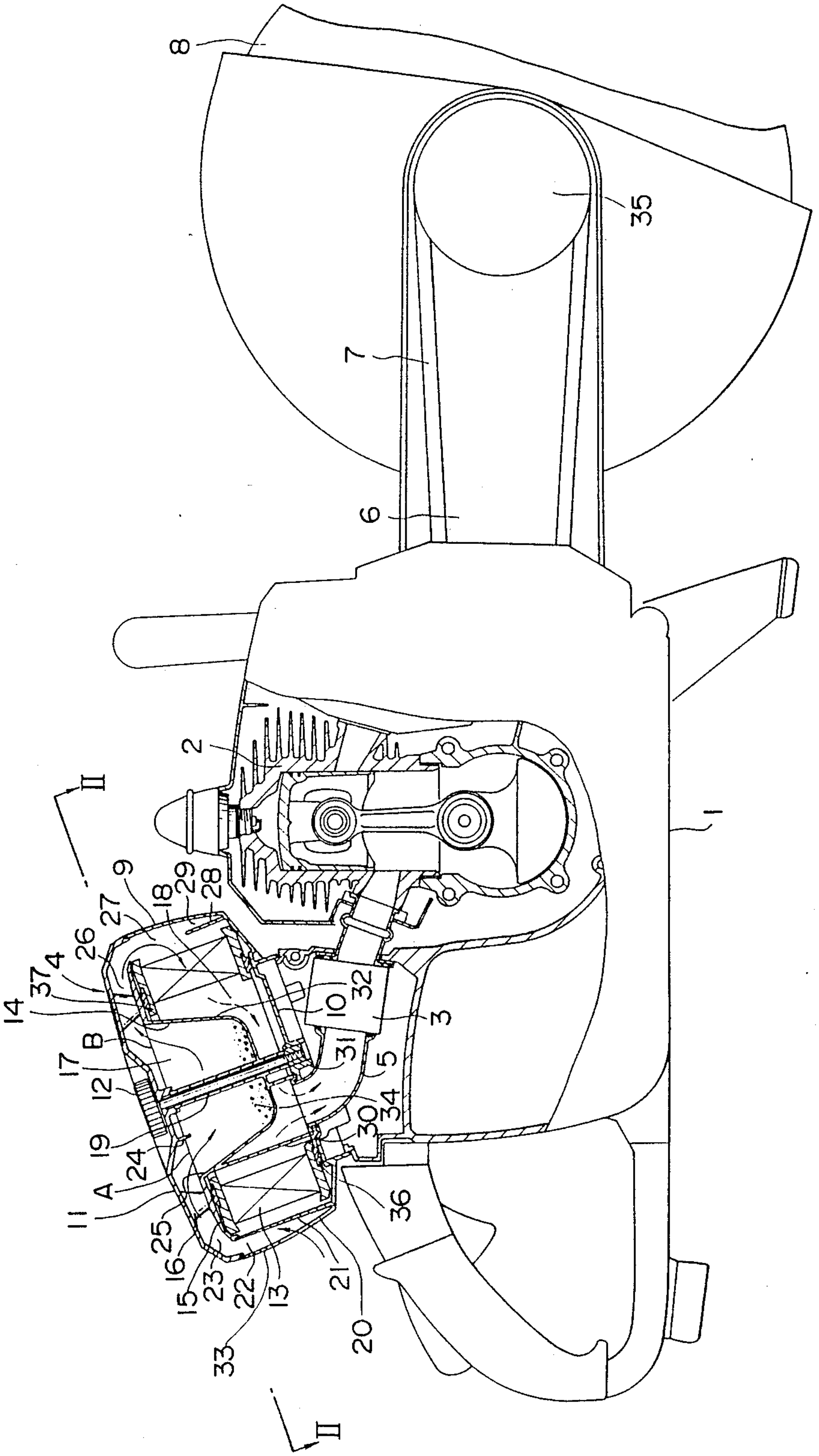
FIG. 1 is a vertical cross-sectional view showing a main part of an engine cutter equipped with an air cleaner in accordance with one embodiment of the invention.

FIG. 1 is a cross-sectional view showing a main part of an engine cutter equipped with an air cleaner in accordance with one embodiment of the invention. This engine cutter incorporates, as shown in FIG. 1, an internal combustion engine 2 as a power source into a main body 1 of the engine cutter, such an internal combustion engine 2 is arranged to be supplied with air-fuel mixture in communication with a carburetor 3 mounted on the main body 1 of the engine cutter. The air cleaner 4 according to the present invention is attached on the upper portion of the main body 1 of the engine cutter. The air cleaner 4 is connected to the carburetor 3 through an elbow 5 to supply purified air to the carburetor 3. Mounted on the forward end of the engine cutter main body 1 is a support arm 6 extending forwardly. At the forward distal end of the support arm 6 a pulley 35 is disposed in order to sustain a driving belt 7 capable of running around it. The driving belt 7 is operatively connected at the opposite rear end of the support arm 6 to an output shaft (not shown) of the internal combustion engine 2, and the driving belt is also operatively connected to a disc cutter 8 rotatably mounted on the forward end of the support arm 6 so that the disc cutter 8 is rotatingly driven by driving force from the internal combustion engine 2 to cut materials such as concrete.

The air cleaner 4 comprises a bowl-shaped air cleaner main body 9 whose upper-end is opened, and the air cleaner main body 9 is fixed at its bottom wall portion 10 on the main body 1 of the engine cutter. The foregoing opening of the air cleaner main body 9 is covered by a cap member 11, while the cap member 11 is securely attached on the air cleaner main body 9 by means of a bolt 12, which extends through a central portion of the air cleaner main body 9 and is threadably engaged with a threaded hole 31 formed on the bottom wall portion 10 of the air cleaner main body 9.

A cleaner element 13 of cylindrical filter type is contained within the air cleaner main body 9. The cleaner element 13 is supported at its lower end surface by the bottom wall portion 10 of the air cleaner main body 9 through a seal packing 36, and the upper end surface of the cleaner element 13 is forcedly held by the cap member 11 through projections 16 formed on the inner surface of the cap member 11 in such a manner that a seal packing 37 is situated interposing between the upper surface of the cleaner element 13 and an upper edge extended portion 15 of a bowl-shaped dividing member 14 placed within a cylindrical inner space of the air cleaner 9. A main body 32 of the dividing member 14 is provided with a concave space 34 which divides the inner space defined by the cleaner element 13 into an upper space 17 and a lower space 18 in air-tight conditions. The dividing member 14 is also formed with an upstanding column portion 19 at the center of the concave space 34. The column portion 19 is clampedly held between the bottom wall portion 10 of the air cleaner main body 9 and the cap member 11 by passing the bolt 12 into a hole formed therethrough.

Figure 2:
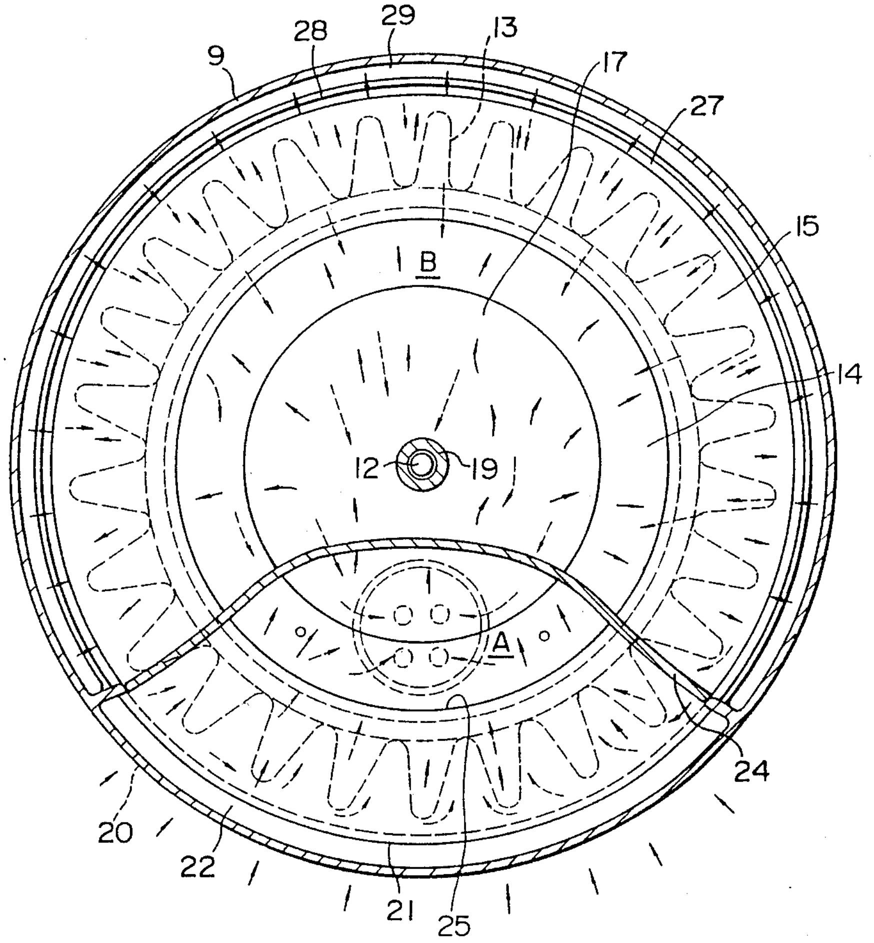
FIG. 2 is an enlarged cross-sectional view of the air cleaner taken along a line II—II in FIG. 1.

At a lower portion of a peripheral wall 33 of the air cleaner main body 9 air intake ports 20 for sucking outside air are formed, which air intake ports 20 define an arcuate air intake chamber 22 between these ports 20 and an inner wall portion 21 upstanding within the air cleaner main body 9 adjacent thereto and extending arcuately circumferentially (see FIG. 2). The air suction chamber 22 is, as shown in FIG. 1, communicated at the upper area with a passage 23 defined between the cap member 11 and one side portion of the upper edge extended portion 15 of the dividing member 14. The passage 23 communicates at its inner end with the upper space 17, i.e. a space within the dividing member 14. The cap member 11 is integrally formed with a deflecting plate 24 projecting downwardly at an entrance portion from the passage 23 into the upper space 17 in order to deflect the air flow from the passage 23 downwardly toward the concave space 34 in the upper space 17. In FIG. 2, a region allowing the air to be delivered from the passage 23 into the upper space 17 is an area A surrounded by an inner peripheral edge 25 of the upper extended portion 15 on the dividing member 14 and the inner surface of the curved deflecting plate 24. At a region B surrounded by the inner peripheral edge 25 of the upper extended portion 15 on the dividing member 14 and an outside surface of the deflecting plate 24, the upper space 17 communicates with a passage 26 between the cap member 11 and the upper extended portion 15 of the dividing member 14 as well as the upper end portion of the cleaner element 13, whereas the passage 26 communicated with an annular chamber 27 defined between the air cleaner main body 9 and the outer periphery of the cleaner element 13. The annular chamber 27 communicates with the lower space 18 through the cleaner element 13. Further, in the annular chamber 27 the inner wall portion 28 upstanding from the bottom wall portion 10 of the air cleaner main body 9 and whose end portion terminates at an intermediate area within the chamber 27, is integrally formed with the air cleaner main body 9. The inner wall portion 28 defines a pocket portion 29 opening upwardly between this inner wall portion and the inner surface of the peripheral wall 33 of the air cleaner main body 9. The inner wall portion 28 extends circumferentially, as shown in FIG. 2, such that both its circumferential ends are connected to the opposite ends of the inner wall portion 21 at the side of the air intake ports 20.

The elbow 5 is coupled at its upper end portion with the bottom wall portion 10 of the air cleaner main body 9 to communicate with the lower space 18. The upper end of the elbow 5 is press-held against the bottom wall portion 10 of the air cleaner main body 9 by means of a press-down portion 30 integrally formed with the dividing member 14 and extending downwardly therefrom.

The outside air is introduced from the air intake ports 20 into the air suction chamber 22 and flows upwardly within the chamber 22. At that time, some of the dust having relatively large weight and particle size carried by the sucked air are removed. Then, the air is deflected and flows into the concave space 34 in the upper space 17 while passing through the passage 23 from the chamber 22. The air introduced into the upper space 17 flows along the inner side surface of the dividing member 14 and, the air is again deflected upwardly to flow toward the passage 26. In this manner, when the air passes through the upper space 17, the relative large-size dust particles contained in the air remain within the concave space 34 of the dividing member 14 so that the dust may be purged from the air. The air then flows into the annular chamber 27 through the passage 26. The air in the annular chamber 27 flows downwardly while flowing along the inner surface of the peripheral wall 33 of the bowl-shaped air cleaner main body 9. At that time, some of the dust particles fall down in the pocket portion 29. The air flowing into the annular chamber 27 is delivered from the entire outer peripheral surface of the air cleaner element 13 into the lower space 18 by passing therethrough and thus finally purified. This filtered air is sucked into the carburetor 3 passing through the elbow 5 and mixed with the fuel to make the air-fuel mixture, which mixture is supplied to the internal combustion engine 2.

As described above, the air introduced in the air cleaner 4 is such treated that the relative large dust particles are previously removed within the upper space 17 and the annular chamber 27 prior to the purification with the cleaner element 13. The removed dust particles accumulate in the concave space 34 of the dividing member 14 and the pocket portion 29. These accumulated dust particles can be readily exhausted when the bolt 12 is loosened and the cap member 11 is removed from the main body 9 of the air cleaner 4.

What is claimed is:

1. An air cleaner for supplying filtered air to a carburetor of an internal combustion engine via a passage connecting the air cleaner with the carburetor, comprising:

a bowl-shaped air cleaner main body having an upper end opened upwardly, a peripheral wall, at least one air intake port at a portion of the peripheral wall;

a cap member detachably mounted on said air cleaner main body for covering said opened upper end of said air cleaner main body;

a cylindrical cleaner element disposed within said air cleaner main body for purifying the air;

a bowl-shaped dividing member located within a space at the center of said cleaner element including a partition connected to said main body for dividing the space into an upper space and a lower space, said bowl-dividing member including an upper edge extended portion which overlaps the top of said cylindrical cleaner element, the upper space communicating with said at least one air intake port adjacent said partition and being connected to an annular chamber defined between said air cleaner main body and said partition for receiving air from said at least one intake port, and the lower space communicating with the upper space through said cleaner element for receiving air from the upper space, and with the carburetor via an outlet, such that the air sucked from said at least one air intake port passes into the upper space passes through the cleaner element, and is introduced as purified air into the lower space to be delivered to the carburetor.

2. An air cleaner according to claim 1, wherein the upper space communicates with the lower space through said cleaner element, and further comprising an inner wall portion terminating at an intermediate portion of the annular chamber and extending upwardly from a bottom wall portion of said air cleaner main body and defining a pocket portion opening upwardly between said inner wall portion and an inner surface of the peripheral wall of said air cleaner main body.

3. An air cleaner according to claim 1, wherein said cap member is formed with a deflecting plate protruding downwardly to deflect the air toward said upper space.

4. A air cleaner according to claim 2, wherein said cap member is formed with a deflecting plate protruding downwardly to deflect the air toward said upper space.

5. An air cleaner according to claim 1, further comprising an inner wall portion extending upwardly within said air cleaner main body so as to form an arcuate air intake chamber between said at least one air intake port and said air cleaner main body.

* * * * *